(12) United States Patent
Kanjirathinkal et al.

(10) Patent No.: US 11,216,200 B2
(45) Date of Patent: Jan. 4, 2022

(54) PARTITION UTILIZATION AWARENESS OF LOGICAL UNITS ON STORAGE ARRAYS USED FOR BOOTING

(71) Applicant: EMC IP Holding Company LLC, Hopkinton, MA (US)

(72) Inventors: Joseph G. Kanjirathinkal, Cary, NC (US); Peniel Charles, Bangalore (IN); Shamin P. Mohanan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/868,087

(22) Filed: May 6, 2020

(65) Prior Publication Data
US 2021/0349647 A1   Nov. 11, 2021

(51) Int. Cl.
*G06F 3/06* (2006.01)
*G06F 13/42* (2006.01)

(52) U.S. Cl.
CPC .......... *G06F 3/0644* (2013.01); *G06F 3/0604* (2013.01); *G06F 3/067* (2013.01);
(Continued)

(58) Field of Classification Search
CPC .... G06F 3/0604; G06F 3/0644; G06F 3/0653; G06F 3/067; G06F 13/4221; G06F 2213/0036
See application file for complete search history.

(56) References Cited

U.S. PATENT DOCUMENTS 6,275,898 B1 * 8/2001 DeKoning ............ G06F 3/0605
                                                711/114
6,567,397 B1   5/2003 Campana et al.
(Continued)

FOREIGN PATENT DOCUMENTS

CN     103677927 B    2/2017
EP      1117028 A2    7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Eric T Oberly
(74) *Attorney, Agent, or Firm* — Ryan, Mason & Lewis, LLP

(57) ABSTRACT

A host device is configured to communicate over a network with a storage system. The host device comprises a multi-path input-output (MPIO) driver configured to control delivery of input-output (IO) operations from the host device to the storage system over selected ones of a plurality of paths through the network. The MPIO driver is further configured to identify a plurality of partitions of a storage device of the storage system, the storage device being used for booting a server. The MPIO driver is also configured to monitor an amount of consumed space of each partition, to transmit to the storage system data corresponding to the amount of consumed space of each partition, to process data from the storage system indicating that a size of the storage device has been increased, and to increase a size of one or more of the partitions.

20 Claims, 7 Drawing Sheets

(52) U.S. Cl.
CPC ........ *G06F 3/0653* (2013.01); *G06F 13/4221* (2013.01); *G06F 2213/0036* (2013.01)

(56) References Cited

U.S. PATENT DOCUMENTS

| | | | |
|---|---|---|---|
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 9,026,694 | B1 | 5/2015 | Davidson et al. |
| 9,201,803 | B1 | 12/2015 | Derbeko et al. |
| 9,400,611 | B1 | 7/2016 | Raizen |
| 9,430,368 | B1 | 8/2016 | Derbeko et al. |
| 9,594,780 | B1 | 3/2017 | Esposito et al. |
| 9,647,933 | B1 | 5/2017 | Tawri et al. |
| 9,672,160 | B1 | 6/2017 | Derbeko et al. |
| 9,778,852 | B1 | 10/2017 | Marshak et al. |
| 9,965,334 | B1* | 5/2018 | Tan ...................... G06F 9/5077 |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,369 | B1 | 12/2019 | Mallick et al. |
| 10,606,496 | B1 | 3/2020 | Mallick et al. |
| 10,637,917 | B2 | 4/2020 | Mallick et al. |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2006/0026346 | A1 | 2/2006 | Kadoiri et al. |
| 2006/0277383 | A1* | 12/2006 | Hayden ............... H04L 67/1097 711/170 |
| 2007/0174849 | A1 | 7/2007 | Cheung et al. |
| 2008/0043973 | A1 | 2/2008 | Lai et al. |
| 2008/0201458 | A1 | 8/2008 | Salli |
| 2010/0313063 | A1 | 12/2010 | Venkataraja et al. |
| 2011/0197027 | A1 | 8/2011 | Balasubramanian et al. |
| 2011/0296230 | A1 | 12/2011 | Chen et al. |
| 2012/0011329 | A1* | 1/2012 | Nonaka ................... G06F 3/067 711/154 |
| 2012/0102369 | A1 | 4/2012 | Hiltunen et al. |
| 2013/0117766 | A1 | 5/2013 | Bax et al. |
| 2014/0105068 | A1 | 4/2014 | Xu |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2017/0235507 | A1 | 8/2017 | Sinha et al. |
| 2018/0189635 | A1 | 7/2018 | Olarig et al. |
| 2018/0253256 | A1 | 9/2018 | Bharadwaj |
| 2018/0314427 | A1* | 11/2018 | Dalmatov ............. G06F 3/0644 |
| 2018/0317101 | A1 | 11/2018 | Koue |
| 2019/0018607 | A1* | 1/2019 | Kotian .................. G06F 3/0604 |
| 2019/0042135 | A1* | 2/2019 | Szwarc ................. G06F 3/0659 |
| 2019/0095299 | A1 | 3/2019 | Liu et al. |
| 2019/0108888 | A1 | 4/2019 | Sarkar et al. |
| 2019/0129645 | A1* | 5/2019 | Ruccia ................. G06F 3/0644 |
| 2019/0310790 | A1* | 10/2019 | Allen ................... G06F 3/0647 |
| 2020/0097203 | A1 | 3/2020 | Mallick et al. |
| 2020/0106698 | A1 | 4/2020 | Rao et al. |
| 2020/0110552 | A1 | 4/2020 | Kumar et al. |
| 2020/0112608 | A1 | 4/2020 | Patel et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS vol. Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 15/795,653 filed in the name of Maneesh Pusalkar et al. on Oct. 27, 2017, and entitled "Storage System with Network-Wide Configurable Device Names." Patented on 5/12 U.S. Pat. No. 10,652,206.

U.S. Appl. No. 16/697,393 filed in the name of Vinay G. Rao et al. on Nov. 27, 2019, and entitled "Automated Seamless Migration of Logical Storage Devices."

U.S. Appl. No. 16/710,828 filed in the name of Amit Pundalik Anchi et al. on Dec. 11, 2019, and entitled "Automated Seamless Migration with Signature Issue Resolution."

NetApp, Inc., "About SAN Booting," https://library.netapp.com/ecmdocs/ECMP1204463/html/GUID-09F3890A-CFA5-4966-B628-431B7302A6BF.html, Accessed Mar. 3, 2020, 2 pages.

Dell Community, "Boot from SAN Implementation and Best Practices Guide," https://www.dell.com/community/Host-Systems/Boot-from-SAN-Implementation-and-Best-Practices-Guide/td-p/6984863, Apr. 10, 2014, 6 pages.

Wikipedia, "Disk Partitioning," https://en.wikipedia.org/w/index.php?title=Disk_partitioning&oldid=945711908, Mar. 15, 2020, 6 pages.

Wikipedia, "GUID Partition Table," https://en.wikipedia.org/w/index.php?title=GUID_Partition_Table&oldid=937056527, Jan. 22, 2020, 19 pages.

Tech Terms, "Partition," https://techterms.com/definition/partition, Accessed Mar. 3, 2020, 2 pages.

Wikipedia, "Partition Table," https://en.wikipedia.org/w/index.php?title=Partition_table&oldid=937114277, Jan. 23, 2020, 1 page.

NetApp, Inc., "Setting up a SAN Boot LUN for Windows Server," https://library.netapp.com/ecmdocs/ECMP1204463/html/GUID-76BFD6AC-BC2A-419A-9DD3-D98423B2B67F.html, Accessed Mar. 3, 2020, 4 pages.

Microsoft, "Support for Booting from a Storage Area Network (SAN)," https://support.microsoft.com/en-us/help/305547/support-for-booting-from-a-storage-area-network-san, Jun. 9, 2015, 5 pages.

M. Rouse, "Volume Manager," https://searchstorage.techtarget.com/definition/volume-manager, Accessed Mar. 26, 2020, 5 pages.

D. Epping, "Ops Changes Part 3—Local Disk vs USB vs BFS,"

(56) References Cited

OTHER PUBLICATIONS https://blogs.vmware.com/vsphere/2011/02/ops-changes-part-3-local-disk-vs-usb-vs-bfs.html, Feb. 24, 2011, 10 pages.

* cited by examiner

| Byte | Bit 7 | 6 | 5 | 4 | 3 | 2 | 1 | 0 | Values |
|---|---|---|---|---|---|---|---|---|---|
| 0 | OPERATION CODE (0x4C) | | | | | | | | 0x4C |
| 1 | Reserved | | | | | | PCR | SP | 0x00 |
| 2 | PC | | Page code | | | | | | 0x3E |
| 3 | Subpage code | | | | | | | | 0x00 |
| 4 | Reserved | | | | | | | | 0x00 |
| 5 | Reserved | | | | | | | | 0x00 |
| 6 | Reserved | | | | | | | | 0x00 |
| 7 | (MSB) Allocation Length | | | | | | | | Vary |
| 8 | (LSB) | | | | | | | | |
| 9 | CONTROL | | | | | | | | 0x00 |

| Byte \ Bit | 7 | 6 | 5 | 4 | 3 | 2 | 1 | 0 |
|---|---|---|---|---|---|---|---|---|
| 0 | | | | Page code = 0x3E | | | | |
| 1 | | | | Reserved | | | | |
| 2 | (MSB) | | | Page length | | | | |
| 3 | | | | | | | | (LSB) |
| 4....7 | | | | PAGE_PARAM_HDR | | | | |
| 8..... | | | | <MPIO Driver shares LUN ID for device which is running out of space> | | | | |
| .....vary | | | | | | | | |

| Byte | Bit 7 | 6 | 5 | 4 | 3 | 2 | 1 | 0 | Values |
|---|---|---|---|---|---|---|---|---|---|
| 0 | \multicolumn OPERATION CODE (0x4D) | | | | | | | | 0x4D |
| 1 | \multicolumn Reserved | | | PC | | | Obsolete | SP | 0x00 |
| 2 | \multicolumn Page code | | | | | | | | 0x32 – example |
| 3 | \multicolumn Subpage code | | | | | | | | 0x00 |
| 4 | \multicolumn Reserved | | | | | | | | 0x00 |
| 5 | (MSB) | | | | | | | | 0x00 |
| 6 | \multicolumn Parameter pointer | | | | | | | (LSB) | 0x02 |
| 7 | (MSB) | | | | | | | | 0x00 |
| 8 | \multicolumn Allocation length | | | | | | | (LSB) | 0x91 |
| 9 | \multicolumn CONTROL | | | | | | | | 0x00 |

FIG. 6

| Byte | Bit 7 | 6 | 5 | 4 | 3 | 2 | 1 | 0 |
|---|---|---|---|---|---|---|---|---|
| 0 | | | | Page code = 0x32 | | | | |
| 1 | | | | Reserved | | | | |
| 2 | (MSB) | | | Page length | | | | |
| 3 | | | | | | | | (LSB) |
| 4-7 | | | | Parameter Header | | | | |
| 8-9 | | | | Version | | | | |
| 10-73 | | | | < Details of LUNs for which size is increased > (64B) | | | | |
| 74-137 | | | | | | | | |
| 138-141 | | | | | | | | |
| 142-145 | | | | | | | | |

PARTITION UTILIZATION AWARENESS OF LOGICAL UNITS ON STORAGE ARRAYS USED FOR BOOTING

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operations for delivery to the storage system. In conventional approaches, storage arrays can identify amounts of consumed space of storage devices and/or storage groups (also referred to herein as "storage pools") corresponding to the storage devices.

In a boot from storage array network (SAN) scenario, servers utilize an operating system installed on external SAN-based storage to boot up rather than booting off the local internal disk of the server or direct attached storage. Boot from SAN allows for increased server density, easier server replacement by having a new server point to the previously used boot from SAN location, elimination of local disks on the servers, and increased reliability because a boot device can be accessed through multiple paths, avoiding a single point of failure.

When implementing boot from SAN, it is important that defined partitions in a boot device of an operating system are not fully allocated, and that there is sufficient space for the operating system to efficiently boot up and run without failing. For example, maintaining ample space in the partitions is necessary for proper patch management, upgrades, rebooting and overall performance of an operating system. As noted above, arrays may currently identify total consumption of boot from SAN devices, but lack the capability to identify defined partitions and partition utilization of boot from SAN devices, leading to significant performance degradations of an operating system.

SUMMARY

Illustrative embodiments configure a multi-path layer of one or more host devices to include functionality for managing partitions in a logical unit (LUN) that is used for booting a server. The management of the partitions ensures that there is enough space on the LUN so that booting is not adversely affected. The multi-path layer illustratively comprises at least one multi-path input-output (MPIO) driver configured to process IO operations of at least one host device. The MPIO driver monitors space utilization in each partition, and transmits the space utilization data to a storage array, which expands the size of the LUN when predefined consumption thresholds of one or more of the partitions are exceeded. Once the size of LUN is increased, the MPIO driver is configured to expand the partitions requiring a size increase, leading to enhanced overall performance.

In one embodiment, an apparatus comprises a host device configured to communicate over a network with a storage system. The host device comprises an MPIO driver configured to control delivery of IO operations from the host device to the storage system over selected ones of a plurality of paths through the network. The MPIO driver of the host device is further configured to identify a plurality of partitions of a storage device of the storage system. The storage device is used for booting a server. The MPIO driver is also configured to monitor an amount of consumed space of each partition of the plurality of partitions, to transmit to the storage system data corresponding to the amount of consumed space of each partition, to process data from the storage system indicating that a size of the storage device has been increased, and to increase a size of one or more of the plurality of partitions responsive to the increase of the size of the storage device.

These and other illustrative embodiments include, without limitation, apparatus, systems, methods and computer program products comprising processor-readable storage media.

BRIEF DESCRIPTION OF THE DRAWINGS

FIG. 4 is an example of a log select command structure to send partition utilization information to a target in an illustrative embodiment.

FIG. 6 is an example of a log sense command structure to read logical device expansion status information from a target in an illustrative embodiment.

FIG. 7 is an example of a log sense page comprising logical device expansion status information from a target in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
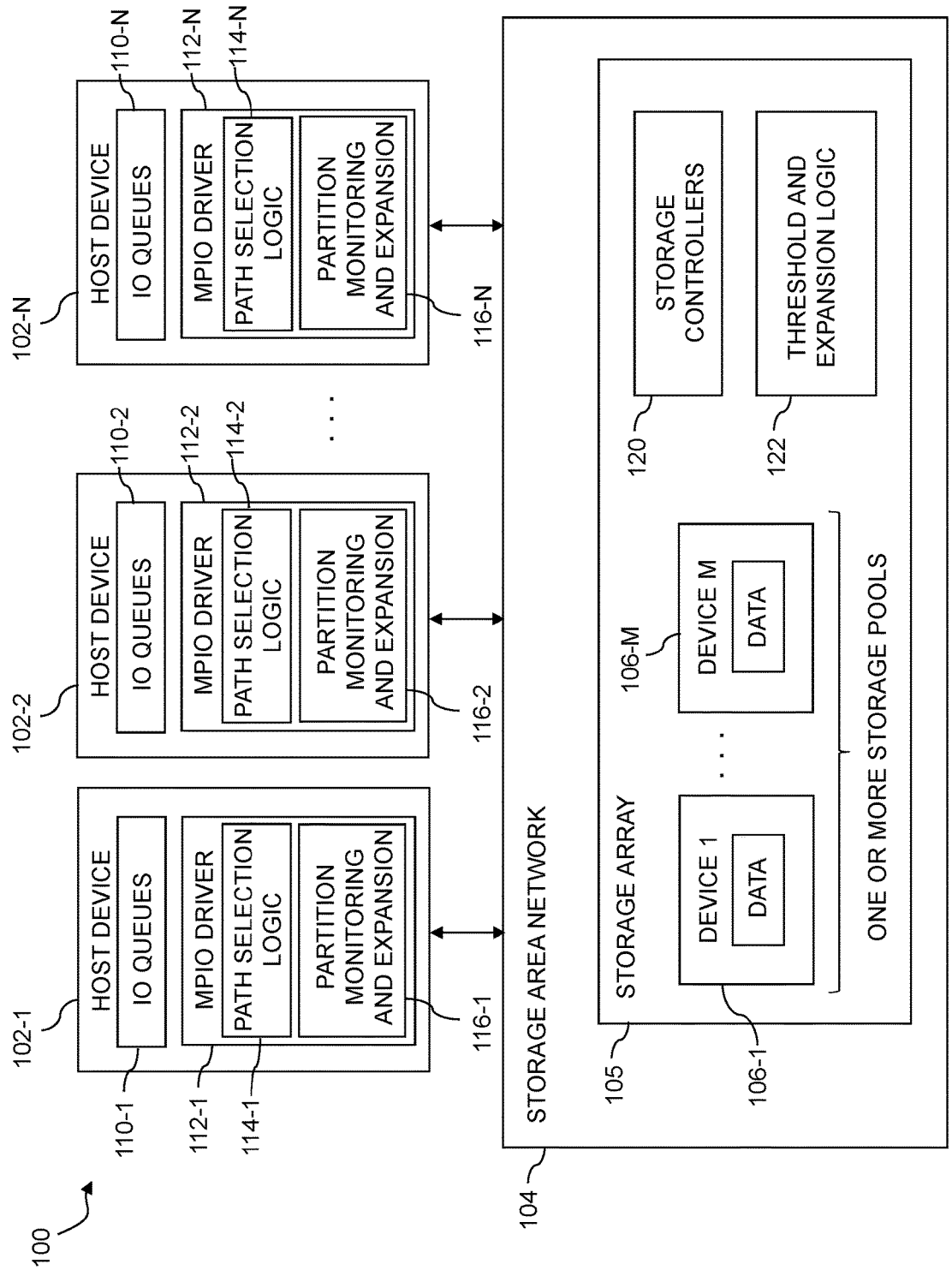
FIG. 1 is a block diagram of an information processing system configured with functionality in a multi-path layer of a host device for managing partitions of a storage device of a storage array that is used for booting a server in an illustrative embodiment.

FIG. 1 shows an information processing system 100 configured in accordance with an illustrative embodiment. The information processing system 100 comprises a plurality of host devices 102-1, 102-2, ... 102-N. The host devices 102 communicate over a storage area network (SAN) 104 with at least one storage array 105. The storage array 105 comprises a plurality of storage devices 106-1, ... 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement LUNs configured to store objects for users associated with the host devices 102. These objects can comprise files, blocks or other types of objects. In a boot from SAN scenario, servers utilize an operating system installed on external SAN-based storage, such as, for example, on a LUN, to boot up rather than booting off the local internal disk of the server or direct attached storage.

As used herein, the term "server" is to be broadly construed, and may encompass a host device, such as, for example, host device 102-1, a portion of a host device or a processing device separate from a host device.

The host devices 102 interact with the storage array 105 utilizing read and write commands as well as other types of commands, such as, for example, log select and log sense commands described further herein, that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, ... 110-N and respective MPIO drivers 112-1, 112-2, ... 112-N. The MPIO drivers 112 collectively comprise a multi-path layer of the host devices 102. The multi-path layer provides functionality for managing partitions of a storage device of a storage array that is used for booting a server. Such functionality is provided at least in part using respective instances of path selection logic 114-1, 114-2, . . . 114-N, and respective instances of partition monitoring and expansion logic 116-1, 116-2, . . . 116-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for managing partitions of a storage device of a storage array that is used for booting a server. Other types of MPIO drivers from other driver vendors may be suitably modified to incorporate functionality for managing partitions of a storage device of a storage array that is used for booting a server as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105, or other types of functions, such as log select commands to send partition utilization information to a target, and log sense commands to read logical device expansion status information from a target. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, log select and log sense commands as described herein, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As is apparent from the foregoing, MPIO driver 112-1 of host device 102-1 is configured to control delivery of IO operations from the host device 102-1 to the storage array 105 over selected paths through the SAN 104.

The MPIO driver 112-1 is further configured with partition monitoring and expansion logic 116-1 to monitor space utilization in each partition of a LUN being used for booting of a server. Using, for example, log select commands, the MPIO driver 112-1 transmits the space utilization data to the storage array 105. The storage array 105 using, for example, a storage controller 120 and threshold and expansion logic 122, expands the size of the LUN when predefined consumption thresholds of one or more of the partitions are exceeded. Once the size of LUN is increased, the MPIO driver 112-1 uses, for example, log sense commands to receive data that the size of the LUN has been increased. Using the partition monitoring and expansion logic 116-1, the MPIO driver 112-1 is configured to expand the partitions of the LUN requiring a size increase, leading to enhanced overall performance. Additional examples of managing partitions of a storage device of a storage array that is used for booting a server are described below in conjunction with the embodiments of FIGS. 1 through 7.

In the FIG. 1 embodiment, the storage array 105 comprises a plurality of storage controllers 120 and one or more instances of threshold and expansion logic 122. A more detailed example of the threshold and expansion logic 122 will be described below in conjunction with the embodiments of FIGS. 1 through 7.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

In the FIG. 1 embodiment, one or more of the storage devices 106, such as a logical storage device, like a LUN, is provisioned as a boot from SAN device for a server, so that the logical storage device is used for booting the server instead of booting off a local internal disk of the server or direct attached storage. The server may be a server on which the host device resides or otherwise associated with the host device. Alternatively, the server may be independent of the host device. The logical storage device 106 includes partitions created on the logical storage device during installation of an operating system on the logical storage device 106.

As used herein, a "partition" refers to a region on a storage device that can be separately managed. An operating system treats partitions as separate logical volumes even though the partitions are on the same storage device. Information about each partition, including locations and sizes of the partitions are organized and stored in a "partition table." Depending on the operating system, a storage device may be formatted with one or more partitions. For example, Windows and Linux operating systems utilize multiple partitions, while other operating systems may only require one partition.

In a non-limiting example, a Linux operating system may comprise root, swap and home partitions, and a Windows operating system may include a primary partition often designated by the drive letter "C:," which includes the active file system comprising the operating system, the page/swap file, utilities, applications, and user data. Other partitions may exist in a Windows system that can be visible as drives, such as, for example, "D:." Alternatively, Windows drive letters may not necessarily correspond to partitions in a one-to-one fashion, and there may be more or fewer drive letters than partitions.

According to an embodiment, a storage device 106 that is used for booting has the following definitions:

1) BFS (Boot from SAN) device ID, which is a unique identifier for the boot from SAN storage device, and the total size of the device. For example, a BFS device ID of 1102 and a size of 100 GB may be represented as "1102, 100 GB," along with the name of the associated storage array 105.

2) Description of the storage device, indicating what the device is used for, the operating system and the corresponding host. For example, a description stating BFS device for the RHEL 8 host "YYYY" indicates that the device is a boot from SAN device for a Red Hat Enterprise Linux 8 operating system for a host server "YYYY."

3) Pre-defined policy outlining the amount of extra space by which a boot from SAN storage device is to be automatically expanded following a determination that one or more partitions of the boot from SAN device have exceeded a threshold amount of consumed space. For example, the policy indicates that a storage array must automatically expand the boot from SAN device (e.g. LUN) by a given amount of gigabytes in response to a determination that one or more partitions of the storage device have exceeded a critical amount of utilized storage space (e.g., greater than a given percentage of the capacity of the partition).

4) A partition table identifying each partition, including locations and sizes of each partition, and amounts of available space in each partition. As described further herein, the partition table of the boot from SAN device is updated periodically by the MPIO driver 112-1 and the updated partition table is sent to the storage array 105 via the MPIO driver 112-1 using a command, such as, for example, an in-band log select SCSI command. The updated partition table can indicate, for example, changes in the amounts of available space in each partition.

In a non-limiting operational example, for an RHEL 8 server, the partitions in a partition table may be defined as (i) "/=20 GB" (root partition with 20 GB available); (ii) "/swap=48 GB" (swap partition with 48 GB available); (iii) "/home=25 GB" (home partition with 25 GB available); and (iv) "unused size=7 GB" (7 GB remaining unused space of the storage device).

In another non-limiting operational example, for a Windows server, the partitions in a partition table may be defined as (i) "C:\=100 GB" (primary partition with 100 GB available); and (ii) "D:\=500 GB" (additional/extended partition with 500 GB available).

As noted herein, the defined partitions and space thereof can vary based on the type of operating system and/or the implemented software volume manager. A volume manager refers to an operating system used for controlling capacity allocation in storage devices.

As explained herein, threshold amounts of consumed space of each partition, when exceeded will trigger a storage array to increase the size of the storage device when there is available space to do so. The thresholds can be expressed, for example, in terms of percentages of used space of each partition, and may be determined and input to the system 100 by a user, such as, for example, an administrative user.

In a non-limiting operational example, for an RHEL 8 server, the partitions may be assigned the following threshold percentages: (i) "/=65%" (root partition with a threshold of 65% of available space consumed); (ii) "/swap=25%" (swap partition with a threshold of 25% of available space consumed); and (iii) "/home=70%" (home partition with a threshold of 70% of available space consumed).

In another non-limiting operational example, for a Windows server, the partitions may be assigned the following threshold percentages: (i) "C:\=65%" (primary partition with a threshold of 65% of available space consumed); and (ii) "D:\=60%" (additional/extended partition with a threshold of 65% of available space consumed).

In connection with approaching or exceeding a partition threshold, a criteria for when and the type of warning issued by a storage array 105 can be defined by an array 105 or may be determined and input to the system 100 by a user, such as, for example, an administrative user. For example, levels of alert from high to low may be defined as critical, warning and informational. A storage array 105 may issue a critical message to a storage administrator accessing the system through a host device 102 when the storage array 105 determines that a threshold amount of consumed space of one or more of the partitions has been exceeded. A storage array 105 may issue a warning message to a storage administrator when the storage array 105 determines that an amount of consumed space of one or more of the partitions is in a range that is close to reaching the threshold. In a non-limiting example, a warning message may be issued when the consumed space is at, for example, 75% to 99% of the threshold. A storage array 105 may issue an informational message to a storage administrator when the storage array 105 determines that an amount of consumed space of one or more of the partitions is beginning to approach, but is not in a range of being what has been defined as close to reaching the threshold. In a non-limiting example, an informational message may be issued when the consumed space is at, for example, 60% to 75% of the threshold.

According to an embodiment, an algorithm for managing partitions of a storage device used for booting includes defining a policy that specifies an amount of space by which a boot from SAN storage device should be increased following a determination by a storage array 105 that a threshold amount of consumed space of one or more of the partitions of the storage device has been exceeded. In a non-limiting example, by way of illustration, the policy can specify that a LUN or other logical storage device be automatically expanded by a certain number of gigabytes following a determination that a threshold has been exceeded. The policy can be defined by a user, such as a storage administrator during the process of creating the boot from SAN device. In the absence of a policy specifying the amount of space by which a boot from SAN storage device should be increased, the amount of space increase can vary based on space availability and/or a dynamic determinations of how much additional space is needed.

In the algorithm, an MPIO driver 112-1 of a host device 102-1 detects the boot from SAN device of the operating system. An administrator can have access to the MPIO driver 112-1 through the host device 102-1. Using, for example, the partition monitoring and expansion logic 116-1, the MPIO driver 112-1 analyzes the partition table of the storage device 106 being used for booting, and determines the space utilization of each partition, identifying the amount of consumed space of each partition.

Using, for example, the path selection logic 114-1 and the partition monitoring and expansion logic 116-1, the MPIO driver 112-1 transmits data to the storage array 105 including the determined space utilization of each partition, and the identified amount of consumed space of each partition of the storage device 106 used for booting. The data is transmitted to the storage array 105 via a command, such as, for example, an SCSI command, like a log select command. According to an embodiment, the MPIO driver 112-1 transmits such data to the storage array 105 after specified increases in the consumed space of the partitions. For example, by way of illustration, the MPIO driver 112-1 transmits such data to the storage array 105 after every 5%-10% increase in consumed space of a partition. Other criteria for the frequency of the data transmission can be used, such as for example, the passage of time, where the data is transmitted after specified time periods (e.g., every minute, hour, 12 hours, day, etc.).

Based on the received data, the partition table is defined or updated on the storage array 105. For example, in an initial transmission of the data from the MPIO driver 112-1 to the storage array 105, the partition table is defined on the storage array 105. At this point, according an embodiment, a storage administrator can determine and set the threshold amounts of consumed space of each partition, which when exceeded will trigger the storage array 105 to increase the size of the storage device 106. As noted above, the thresholds can be expressed, for example, in terms of percentages of used space of each partition. In subsequent periodic transmissions from the host device 102-1 to the storage array 105 of the data comprising the space utilization of each partition, and the identified amount of consumed space of each partition, the partition table on the storage array 105 is updated with the current usage information at that time.

The threshold and expansion logic 122 of the storage array 105 processes the received data comprising the space utilization of each partition and the identified amount of consumed space of each partition to determine whether any of the pre-defined partition thresholds have been exceeded, an amount of consumed space of one or more of the partitions is in a range that is close to reaching a threshold, and/or an amount of consumed space of one or more of the partitions is beginning to approach, but is not in a range of being close to reaching a threshold. In response to a threshold of one or more partitions having been exceeded, the storage array 105 issues a critical alert that can be transmitted to a host device 102-1 for viewing by a user, such as an administrator. Alternatively, or in addition, in response to an amount of consumed space of one or more of the partitions being in a range that is close to reaching a threshold, the storage array 105 issues a warning alert for a user. Further, alternatively, or in addition, in response to an amount of consumed space of one or more of the partitions that is beginning to approach, but is not in a range of being close to reaching a threshold, the storage array 105 issues an informational alert for a user.

According to an embodiment, responsive to the determination that one or more of the pre-defined partition thresholds have been exceeded, the storage array 105 (e.g., the threshold and expansion logic 122) automatically expands the size of the storage device 106 used for booting. The expansion can be based on the predefined policy that specifies the amount of space by which a boot from SAN storage device should be increased when the storage array determines that a partition threshold has been exceeded. The MPIO driver 112-1 is made aware of the size expansion of the storage device 106 via a command, such as, for example, a SCSI log sense command, whereby the MPIO driver 112-1 reads the storage device expansion status from the storage array 105. The log sense command can be issued by the MPIO driver 112-1 periodically (e.g., every 10 seconds, every minute, etc.) to determine whether any storage device size expansions have been performed by the storage array 105.

Responsive to the size expansion of the storage device 106, and the determination thereof by the MPIO driver 112-1, the MPIO driver 112-1 (e.g., the partition monitoring and expansion logic 116-1) increases the space in the partition(s) requiring a space increase. For example, the MPIO driver 112-1 initiates a host scan to consume the newly added space, and expands those partitions where the threshold has been exceeded.

Following a determination that one or more of the pre-defined partition thresholds have been exceeded, the storage array 105 may determine that there is not a sufficient amount of unused space in the storage device 106 to expand the capacity of the storage device 106, and to expand the one or more partitions which have exceeded the thresholds. In this case, the storage array issues a notification to be sent to a user to so that the user can initiate a manual expansion of the storage device 106 based on parameters set by the user. The manual expansion can be initiated through a user interface for the MPIO driver 112-1 on the host device 102-1.

While the embodiments are described in connection with a boot from SAN device, the embodiments are not necessarily limited thereto, and may be applied to any storage devices where partitions are created at the operating system level.

As noted herein, information can be obtained by the host device 102-1 from the storage array 105, or information can be obtained by the storage array 105 from the host device 102-1 utilizing an in-band communication mechanism in which one or more predetermined commands in a designated storage protocol are sent from the host device 102-1 to the storage array 105 or vice versa. As noted herein above, such predetermined commands can comprise, for example, log sense and log select commands, a mode sense command, a VU command, or combinations of multiple instances of these or other commands, in an otherwise standardized command format, such as a SCSI format or other type of format.

Additionally or alternatively, information can be obtained by the host device 102-1 from the storage array 105, or information can be obtained by the storage array 105 from the host device 102-1 utilizing an out-of-band communication mechanism. For example, an out-of-band communication mechanism of this type can involve host management software of the host device 102-1 communicating with storage array management software of the storage array 105 over an IP network connection or other type of network connection.

These and other functions related to managing partitions of a storage device of a storage array that is used for booting a server that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to manage and expand partitions of a storage device that is used for booting a server are intended to be broadly construed, and should not be viewed as being limited to any particular storage arrangement, such as storage in a particular host device component or using a particular format. Accordingly, such storage can be in a memory or other storage device that is outside of the MPIO driver.

As indicated previously, absent use of the techniques for managing partitions of a storage device used for booting a server as disclosed herein, tasks such as, but not necessarily limited to, patch management, upgrades, booting and rebooting, and overall performance of an operating system can be adversely impacted by failure to have adequate space allocated to the respective partitions of a storage device, such as a LUN.

Such drawbacks are advantageously overcome in illustrative embodiments herein by utilization of a multi-path layer comprising one or more of the MPIO drivers 112 to provide management and expansion of partitions of a storage device of a storage array that is used for booting a server as described above. These embodiments therefore provide a significant advance over conventional techniques that are limited to identifying the total consumption of a boot from SAN device, and that do not provide information on the consumption of the partitions created on the storage device. For example, illustrative embodiments are advantageously configured to provide a storage array with details of partition utilization in a boot from SAN device, so that the storage array can expand the size of the boot from SAN device, and the MPIO drivers 112 can increase the size of the partitions responsive to the expansion of the boot from SAN device, leading to enhanced overall performance.

The above-described functions associated with managing partitions of a storage device of a storage array that is used for booting a server in the MPIO driver 112-1 are carried out at least in part under the control of its path selection logic 114-1 and/or partition monitoring and expansion logic 116-1. For example, the path selection logic 114-1 and/or partition monitoring and expansion logic 116-1 are illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for managing partitions of a storage device of a storage array that is used for booting a server.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in "Dell EMC SC Series Storage and Microsoft Multipath I/O," Dell EMC, CML 1004, July 2018, which is incorporated by reference herein. Such conventional MPIO functionality is suitably modified in illustrative embodiments disclosed herein to support management of partitions of a storage device of a storage array that is used for booting a server.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 and partition monitoring and expansion logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
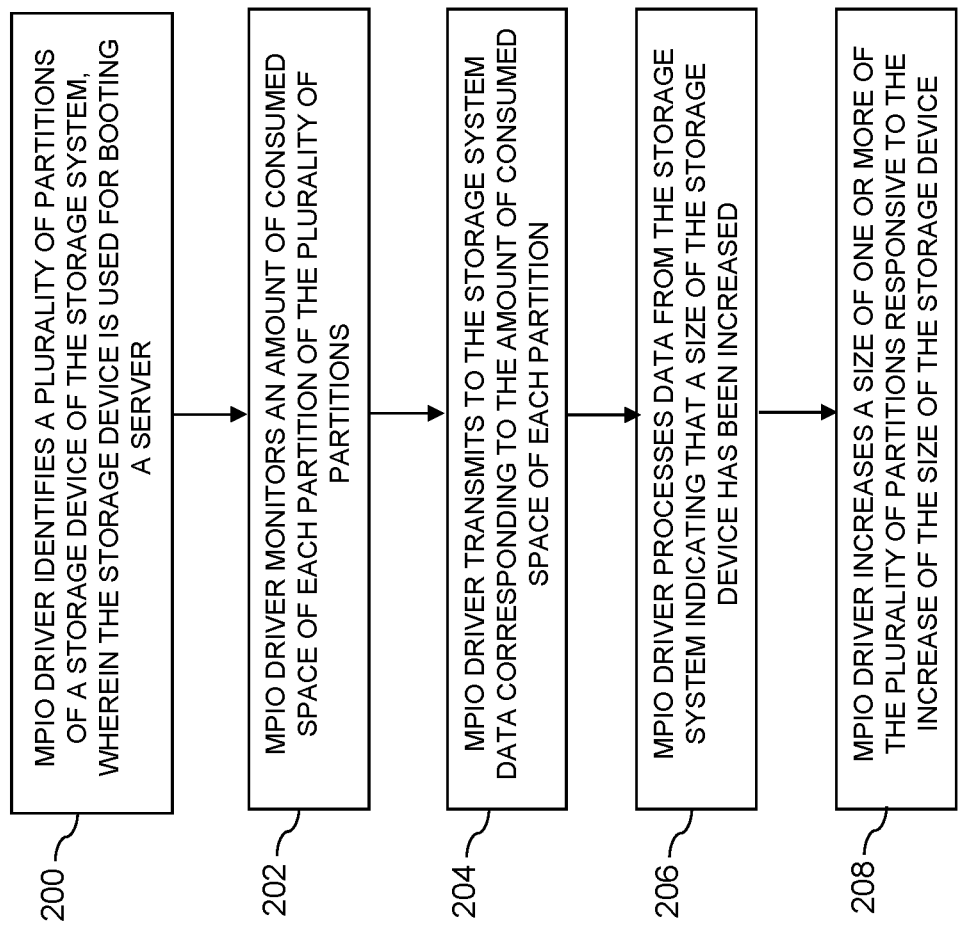
FIG. 2 is a flow diagram of a process for managing partitions of a storage device of a storage array that is used for booting a server in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 and/or partition monitoring and expansion logic 116-1 of the MPIO driver 112-1 of host device 102-1. Other arrangements of host device components and/or other system components can be configured to perform at least portions of one or more of the steps in other embodiments.

In step 200, the MPIO driver identifies a plurality of partitions of a storage device of the storage system. As described herein, the storage device is used for booting a server, and can be a logical storage device, such as, for example, a LUN, which is part of a storage pool of a storage array of the storage system. Depending on the operating system, the plurality of partitions can include, for example, a root partition, a swap partition, a home partition, a primary partition and/or an extended partition. In identifying the plurality of partitions of the storage device, the MPIO driver analyzes a partition table of the storage device.

In step 202, the MPIO driver monitors an amount of consumed space of each partition of the plurality of partitions, and in step 204, the MPIO driver transmits to the storage system data corresponding to the amount of consumed space of each partition. In an embodiment, the data corresponding to the amount of consumed space of each partition is transmitted to the storage system utilizing an access protocol comprising an SCSI access protocol. For example, as described herein, the data is transmitted using a log select command. In transmitting to the storage system data corresponding to the amount of consumed space of each partition, the MPIO driver is configured to update the partition table of the storage device.

In step 206, the MPIO driver processes data from the storage system indicating that a size of the storage device has been increased, and in step 208, the MPIO driver increases a size of one or more of the plurality of partitions responsive to the increase of the size of the storage device. In an embodiment, the data from the storage system indicating that the size of the storage device has been increased is transmitted utilizing the SCSI access protocol. For example, as described herein, the data is transmitted using a log sense command. Updates to the partition table can be provided from the MPIO driver to the storage array periodically. For example, the MPIO driver updates the partition table of the storage device based on a predetermined increase of the amount of consumed space of each partition (e.g., every 5%-10% increase of the amount of consumed space of each partition).

In one or more embodiments, the MPIO driver processes a message from the storage system indicating a relationship of an amount of consumed space of a given partition of the plurality partitions to a threshold amount of consumed space of the given partition. For example, as described herein, the message may be, for example, a critical alert, a warning alert or an informational alert.

According to an embodiment, in increasing the size of the one or more of the plurality of partitions, the MPIO driver scans the storage device, identifies which of the plurality of partitions require a size increase, and increases the size of the identified plurality of partitions requiring the size increase.

In some embodiments, the MPIO driver processes a message from the storage system indicating that the storage device lacks sufficient space to increase the size of the storage device, and generates a message for a user that the storage device lacks sufficient space to increase the size of the storage device. The MPIO driver also detects the storage device of the storage system used for the booting of the server, and identifies, for example, a unique identifier, a total size and a storage pool of the storage device.

Multiple additional instances of the FIG. 2 process may be performed in respective additional host devices that share the storage array. Other embodiments can include multiple storage arrays, with the disclosed functionality for managing partitions of a storage device of a storage array that is used for booting a server being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for managing partitions of a storage device of a storage array that is used for booting a server. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different port resource availability based IO control arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
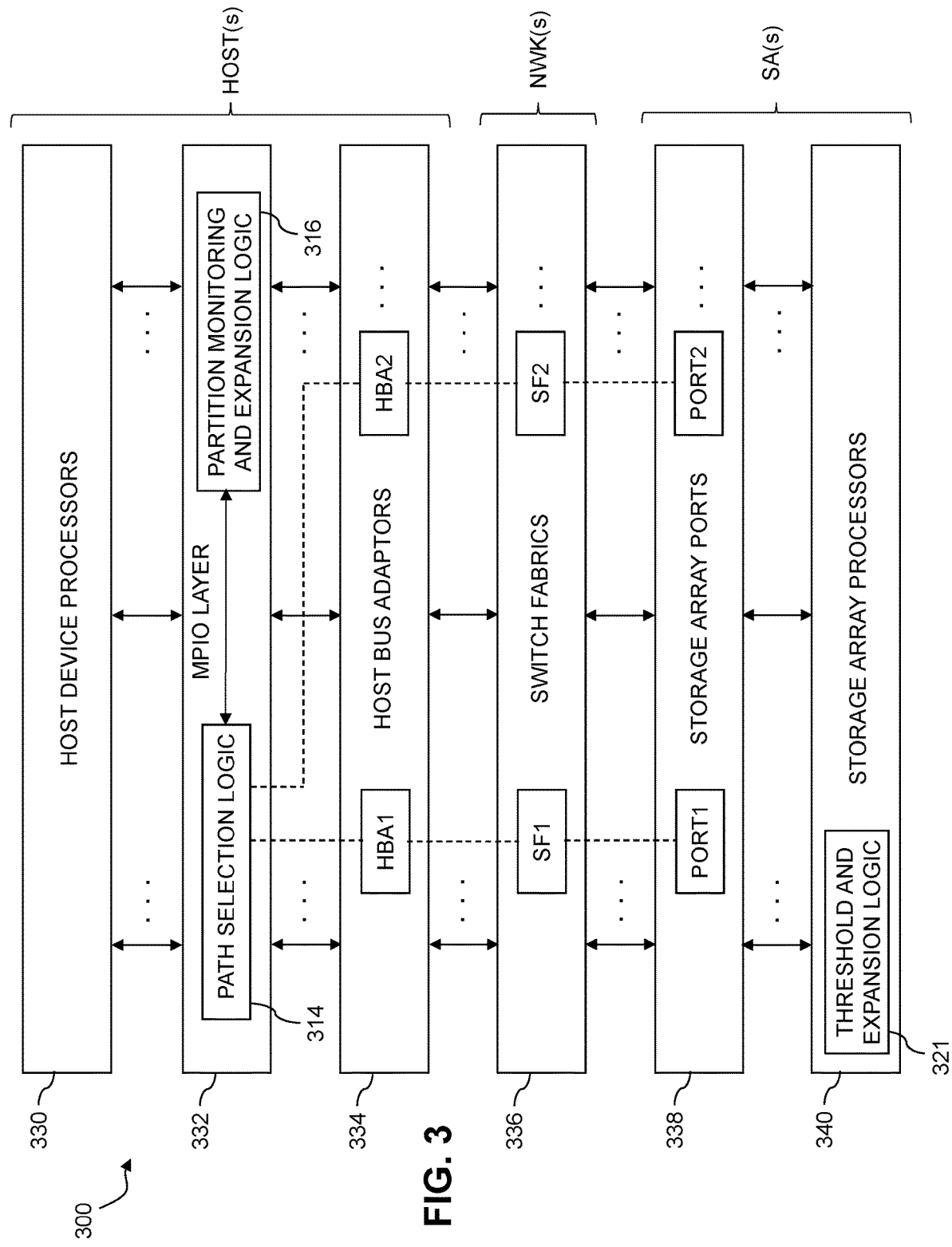
FIG. 3 is a block diagram showing multiple layers of a layered system architecture that includes a multi-path layer with functionality for managing partitions of a storage device of a storage array that is used for booting a server in an illustrative embodiment.

Referring now to FIG. 3, another illustrative embodiment is shown. In this embodiment, an information processing system 300 comprises one or more instances of path selection logic 314, partition monitoring and expansion logic 316 and threshold and expansion logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements management of partitions of a storage device of a storage array that is used for booting a server as characterized by partition monitoring and expansion logic 316. The partition monitoring and expansion logic 316 is illustratively shown as part of the MPIO layer 332. Alternatively, the partition monitoring and expansion logic 316 in other embodiments is illustratively stored, at least partially, in the host device processor layer 330. It is also possible in some embodiments that the partition monitoring and expansion logic 316 can be incorporated within a data structure of the path selection logic 314. The partition monitoring and expansion logic 316 illustratively monitors consumed space of the partitions of one or more storage devices that are used for booting a server in a boot from SAN scenario, such as, for example, one or more storage devices 106 in the storage array 105. The partition monitoring and expansion logic 316, based on path selection determinations made by the path selection logic 314, provides partition utilization information to a storage array, such as storage array 105. The partition utilization information may be provided, for example, using log select commands or other commands disclosed herein. Using, for example, threshold and expansion logic 122 or 321, one or more storage array processors (e.g., storage controllers 120) of the storage array processor layer 340 determine whether consumption thresholds of one or more of the partitions are exceeded. According to an embodiment, in response to an affirmative determination, the storage array processors expand the size of the storage devices that are used for booting a server. The partition monitoring and expansion logic 316, retrieves details of the expansion from the storage array using, for example, log sense commands or other commands disclosed herein. In response to the expansion, the partition monitoring and expansion logic 316 increases the size of the partitions of the storage device that require a size increase.

The MPIO layer 332 is an example of what is also referred to herein as a multi-path layer, and comprises one or more MPIO drivers implemented in respective host devices. Each such MPIO driver illustratively comprises an instance of path selection logic 314 and partition monitoring and expansion logic 316 configured to implement functionality for managing partitions of a storage device of a storage array that is used for booting a server substantially as previously described. Additional or alternative layers and path selection and/or partition monitoring and expansion logic arrangements can be used in other embodiments.

The threshold and expansion logic 321 implemented in the storage array processor layer 340 controls the determination of whether consumption thresholds of one or more of the partitions in a storage device of a storage array are exceeded, and expansion of the size of the storage devices that are used for booting a server. For example, the threshold and expansion logic 321 can include functionality for the system 300 the same or similar to that described in connection with the threshold and expansion logic 122. For example, the threshold and expansion logic 321 processes the received data comprising the space utilization of each partition, and the identified amount of consumed space of each partition to determine whether any of the pre-defined partition thresholds have been exceeded. According to an embodiment, responsive to the determination that one or more of the pre-defined partition thresholds have been exceeded, the threshold and expansion logic 321 automatically expands the size of the storage device used for booting. It is also possible in some embodiments that the threshold and expansion logic 321 can include multiple logic instances for respective ones of a plurality of storage arrays of the system 300.

In the system 300, path selection logic 314 is configured to select different paths for sending IO operations and/or commands from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations and/or commands to the one or more storage arrays having the storage array ports of the storage array port layer 338. In selecting the paths, the path selection logic 314 illustratively limits amounts of IO operations and/or commands that are delivered over one or more paths to particular ones of the ports of a storage array.

It is assumed in this embodiment that the host devices through their respective MPIO drivers and respective instances of path selection logic 314 and partition monitoring and expansion logic 316 provide functionality for managing partitions of a storage device of a storage array that is used for booting a server, possibly with involvement of other host device components.

Accordingly, in some embodiments, the path selection logic 314 utilizes the partition monitoring and expansion logic 316 in determining appropriate paths over which to send particular IO operations and/or commands to ports of one or more storage arrays. As described elsewhere herein, such management of partitions of a storage device of a storage array that is used for booting a server can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides the disclosed partition management and expansion functionality, under the control of a corresponding instance of path selection logic and/or partition monitoring and expansion logic implemented in the MPIO driver, possibly with involvement of one or more other host device components.

Figure 5:
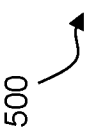
FIG. 5 is an example of a log select page comprising partition utilization information for a target in an illustrative embodiment.

FIG. 4 is an example of a log select command structure 400 to send partition utilization information to a target in an illustrative embodiment, and FIG. 5 is an example of a log select page 500 comprising partition utilization information for a target in an illustrative embodiment. FIG. 6 is an example of a log sense command structure 600 to read logical device expansion status information from a target in an illustrative embodiment, and FIG. 7 is an example of a log sense page 700 comprising logical device expansion status information from a target in an illustrative embodiment.

According to one or more embodiments, referring to FIGS. 4 and 5, a host initiator uses a log select command in a form such as log select page 500 to intimate the storage array 105 that partitions of a boot from SAN storage device 106 are running out of space. Referring to FIGS. 6 and 7, the host initiator continuously checks the response of the storage array 105 using a log sense command, and the host initiator learns from the storage array 105 that the boot from SAN device 106 has been expanded via logical device expansion status information in a log sense page 700.

A log select command provides a technique for an initiator to manage information maintained about its LUNs. The MPIO driver 112-1 uses log select commands to inform a target associated with the storage device 106 of the space utilization of the partitions of the storage device 106, and whether the partitions are running out of space. The storage array 105, upon receipt of the space utilization data, determines whether thresholds have been exceeded, and expands the size of the storage device 106.

The "Allocation Length" in the log select command structure 400 refers to a total length of data in the pages (page code 0x3E), that is sent out by the MPIO driver 112-1 (0 based count).

A log sense command provides a technique for an application client to retrieve operational information maintained by a target device about the target device or its LUNs.

The MPIO driver 112-1 utilizes log sense commands to read storage device expansion status from a storage array 105, which can be done periodically (e.g., every 10 seconds, every 30 seconds, every minute, etc.). The log sense command can retrieve storage device expansion status from software metadata of the storage array 105. Once the MPIO driver 112-1 detects storage device expansion, the MPIO driver 112-1 can increase the size of the partitions needing a size increase.

The particular features and functionality of the illustrative embodiments described above can be varied in other embodiments.

Also, as mentioned previously, different instances of the above-described algorithms and other partition monitoring and expansion techniques can be performed by different MPIO drivers in different host devices.

The particular partition monitoring and expansion arrangements described above are therefore presented by way of illustrative example only. Numerous alternative arrangements of these and other features can be used in implementing the partition management and expansion functionality in other illustrative embodiments.

The illustrative embodiments disclosed herein can provide a number of significant advantages relative to conventional arrangements that are limited to identifying the total consumption of a boot from SAN device. Advantageously, the embodiments configure a multi-path layer of one or more host devices to include functionality for managing partitions of a storage device of a storage array that is used for booting a server, leading to enhanced overall performance. These embodiments provide a significant advance over conventional techniques, which do not provide information on the consumption or provide techniques for the expansion of the partitions created on the storage device. For example, illustrative embodiments are advantageously configured to provide a storage array with details of partition utilization in a boot from SAN device to cause a storage array to expand the size of the boot from SAN device, and an MPIO driver to increase the size of the partitions of the boot from SAN device in response to the expansion of the boot from SAN device.

Moreover, the embodiments provide advances over existing technology by providing techniques for monitoring usage of operating system partitions in partition tables created on a boot from SAN device and for alerting users about over usage of these partitions.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114, partition monitoring and expansion logic 116 and threshold and expansion logic 122 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, partition monitoring and expansion logic, threshold and expansion logic and additional or alternative components. Also, the particular configurations of system and device elements and associated processing operations illustratively shown in the drawings can be varied in other embodiments. For example, a wide variety of different MPIO driver configurations and associated partition management and expansion arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
  a host device comprising a processor coupled to a memory;
  the host device being configured to communicate over a network with a storage system;
  the host device comprising:
  a multi-path input-output driver configured to control delivery of input-output operations from the host device to the storage system over selected ones of a plurality of paths through the network;
  wherein the multi-path input-output driver is further configured:
  to identify a plurality of partitions of a storage device of the storage system, wherein the storage device is used for booting a server;
  to monitor an amount of consumed space of respective partitions of the plurality of partitions;
  to transmit to the storage system data corresponding to the amount of consumed space of the respective partitions;
  to process data from the storage system indicating that a size of the storage device has been increased; and
  to increase a size of one or more of the plurality of partitions responsive to the increase of the size of the storage device;
  wherein, in identifying the plurality of partitions of the storage device, the multi-path input-output driver is configured to analyze a partition table of the storage device;
  wherein, in transmitting to the storage system data corresponding to the amount of consumed space of the respective partitions, the multi-path input-output driver is configured to update the partition table and send at least a portion of the updated partition table to the storage device; and
  wherein the updated partition table indicates a change in an amount of consumed space of at least one of the respective partitions.

2. The apparatus of claim 1 wherein the data corresponding to the amount of consumed space of the respective partitions is transmitted to the storage system utilizing an access protocol comprising a Small Computer System Interface (SCSI) access protocol.

3. The apparatus of claim 2 wherein the data from the storage system indicating that the size of the storage device has been increased is transmitted utilizing the SCSI access protocol.

4. The apparatus of claim 1 wherein the storage device comprises a logical storage device.

5. The apparatus of claim 4 wherein the logical storage device is part of a storage pool of a storage array of the storage system.

6. The apparatus of claim 1 wherein the plurality of partitions comprise at least one of a root partition, a swap partition, a home partition, a primary partition and an extended partition.

7. The apparatus of claim 1 wherein the multi-path input-output driver is configured to update the partition table of the storage device based on a predetermined increase of the amount of consumed space of the respective partitions.

8. The apparatus of claim 1 wherein the multi-path input-output driver is further configured to process a message from the storage system indicating a relationship of an amount of consumed space of a given partition of the plurality partitions to a threshold amount of consumed space of the given partition.

9. The apparatus of claim 1 wherein, in increasing the size of the one or more of the plurality of partitions, the multi-path input-output driver is configured:
  to scan the storage device;
  to identify which of the plurality of partitions require a size increase; and
  to increase the size of the identified plurality of partitions requiring the size increase.

10. The apparatus of claim 1 wherein the multi-path input-output driver is further configured:
  to process a message from the storage system indicating that the storage device lacks sufficient space to increase the size of the storage device; and
  to generate a message for a user that the storage device lacks sufficient space to increase the size of the storage device.

11. The apparatus of claim 1 wherein the multi-path input-output driver is further configured:
  to detect the storage device of the storage system used for the booting of the server; and
  to identify a unique identifier, a total size and a storage pool of the storage device.

12. A method performed by a host device configured to communicate over a network with a storage system, comprising:

configuring a multi-path input-output driver of the host device to control delivery of input-output operations from the host device over selected ones of a plurality of paths through the network;
the multi-path input-output driver:
identifying a plurality of partitions of a storage device of the storage system, wherein the storage device is used for booting a server;
monitoring an amount of consumed space of respective partitions of the plurality of partitions;
transmitting to the storage system data corresponding to the amount of consumed space of the respective partitions;
processing data from the storage system indicating that a size of the storage device has been increased; and
increasing a size of one or more of the plurality of partitions responsive to the increase of the size of the storage device;
wherein identifying the plurality of partitions of the storage device comprises analyzing a partition table of the storage device;
wherein transmitting to the storage system data corresponding to the amount of consumed space of the respective partitions comprises updating the partition table and sending at least a portion of the updated partition table to the storage device;
wherein the updated partition table indicates a change in an amount of consumed space of at least one of the respective partitions; and
wherein the host device comprises a processor coupled to a memory.

13. The method of claim 12 wherein increasing the size of the one or more of the plurality of partitions comprises:
scanning the storage device;
identifying which of the plurality of partitions require a size increase; and
increasing the size of the identified plurality of partitions requiring the size increase.

14. The method of claim 12 wherein the updating of the partition table of the storage device is based on a predetermined increase of the amount of consumed space of the respective partitions.

15. The method of claim 12 further comprising processing a message from the storage system indicating a relationship of an amount of consumed space of a given partition of the plurality partitions to a threshold amount of consumed space of the given partition.

16. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:
to control delivery of input-output operations from the host device to the storage system over selected ones of a plurality of paths through the network;
to identify a plurality of partitions of a storage device of the storage system, wherein the storage device is used for booting a server;
to monitor an amount of consumed space of respective partitions of the plurality of partitions;
to transmit to the storage system data corresponding to the amount of consumed space of the respective partitions;
to process data from the storage system indicating that a size of the storage device has been increased; and
to increase a size of one or more of the plurality of partitions responsive to the increase of the size of the storage device;
wherein, in identifying the plurality of partitions of the storage device, the program code causes the multi-path input-output driver to analyze a partition table of the storage device;
wherein, in transmitting to the storage system data corresponding to the amount of consumed space of the respective partitions, the program code causes the multi-path input-output driver to update the partition table and send at least a portion of the updated partition table to the storage device; and
wherein the updated partition table indicates a change in an amount of consumed space of at least one of the respective partitions.

17. The computer program product of claim 16 wherein the program code causes the multi-path input-output driver to update the partition table of the storage device based on a predetermined increase of the amount of consumed space of the respective partitions.

18. The computer program product of claim 16 wherein the program code further causes the multi-path input-output driver to process a message from the storage system indicating a relationship of an amount of consumed space of a given partition of the plurality partitions to a threshold amount of consumed space of the given partition.

19. The computer program product of claim 16 wherein, in increasing the size of the one or more of the plurality of partitions, the program code causes the multi-path input-output driver:
to scan the storage device;
to identify which of the plurality of partitions require a size increase; and
to increase the size of the identified plurality of partitions requiring the size increase.

20. The computer program product of claim 16 wherein the program code further causes the multi-path input-output driver:
to process a message from the storage system indicating that the storage device lacks sufficient space to increase the size of the storage device; and
to generate a message for a user that the storage device lacks sufficient space to increase the size of the storage device.

* * * * *